(No Model.)
W. D. SHELDON.
LIGHTING RAILROADS.
No. 441,034.  Patented Nov. 18, 1890.
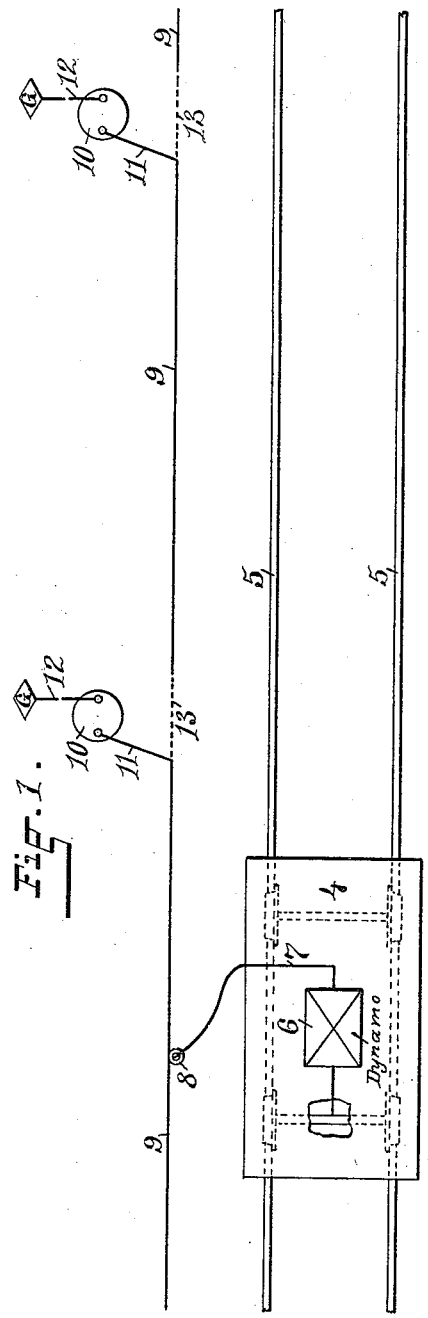
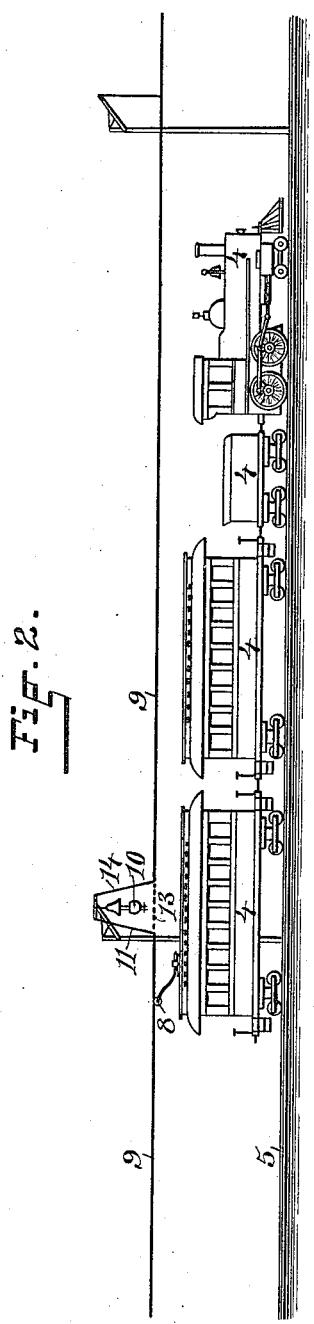
WITNESSES:
Chas. H. Luther Jr.
M. F. Bligh.
INVENTOR:
William D. Sheldon
by Joseph A. Miller & Co.
Attys.

UNITED STATES PATENT OFFICE.

WILLIAM D. SHELDON, OF PROVIDENCE, RHODE ISLAND, ASSIGNOR TO NICHOLAS SHELDON, OF SAME PLACE.

LIGHTING RAILROADS.

SPECIFICATION forming part of Letters Patent No. 441,034, dated November 18, 1890.

Application filed May 15, 1890. Serial No. 351,952. (No model.)

*To all whom it may concern:*

Be it known that I, WILLIAM D. SHELDON, of Providence, in the county of Providence and State of Rhode Island, have invented a new and useful Improvement in Lighting Railroads; and I hereby declare that the following is a full, clear, and exact description of the same, reference being had to the accompanying drawings, forming part of this specification.

This invention has reference to an improved system for lighting a railroad and signaling the approach of a train; and it consists in sections of electric conductor-wires suspended over the railroad-track connected with an electric lamp or lamps, and a source of electric energy carried on the train connected by means of wipers or a trolley with the light-wires and with the ground, as will be more fully set forth hereinafter.

Figure 1 is a skeleton plan showing the line-wires connected with an electric lamp and a source of electric energy carried on the train. Fig. 2 is a side view of a railroad-train and overhead conductor-wires connected with an electric lamp and with the train by means of a trolley.

In the drawings, the numbers 4 indicate the train; 5, the rails; 6, the dynamo or other source of electric energy connected from one pole through the axle, the wheels, and the rails with the ground.

The number 7 indicates the conductor connecting the trolley 8 with the dynamo or other source of electric energy.

9 indicates the conductor-wires. These wires are of such length as the conditions of the road may require and form independent sections or blocks. The ends of the conductor-wires of each section or block are connected with one pole of the electric lamps 10 by the conductor 11. The other pole of the lamp is connected with the ground by means of the conductor-wire 12. For the purpose of forming a continuous wire for the trolley 8, the conductor-wires 9 are connected by the cords or wire 13, formed of non-conducting material, or connected with the wires 9 so as to prevent the conduction of electric energy over the section or space. Intermediate lamps may be placed between the commencement of the section or block and the end lamp of the section or block. Such a lamp 10 is shown in Fig. 2. The branch conductor 11 connects the line-wire 9 with one pole of the lamp 10, and the branch conductor 14 connects the other pole of the lamp with the conductor 9, the insulated wire 13 connecting the conductor-wires 9; or, to describe this arrangement of the intermediate lamps in a different manner, it may be said that the conductor-wires 9 are connected with the two poles of the lamp 10, and the insulated section 13 forms a path and guide for the trolley. The line-wires 9 are suspended over or practically over the center of the track from arms extending from poles, as are shown in Fig. 2, or in any other suitable manner, and the lamps 10 are also suspended over or practically over the center of the track.

I will now more fully describe the operation of my improved railroad-lighting system. The system is adapted especially for tracks on which the trains all run in one direction. Considering now that the trolley on the moving train reaches the commencement of a section of conductor line-wire 9 two, four, or more miles in length. Such a section has one lamp on the other end of the section two, four, or more miles in advance of the train. This end lamp is connected by one pole with the line-wire 9 and by the other pole with the ground. The trolley connects the first end with the dynamo, storage-battery, or other source of electric energy on the train at one pole. The opposite pole is connected with the ground by means of the axle, wheels, and rail, or by any other practical connection. The circuit is therefore closed through the earth and the lamp at the farthest end of the block or section is lighted, giving notice of the approach of the train. If now the configuration of the road or other causes require any desired number of intermediate lamps, these are connected with the line-wires 9 by the branch wires 11 and 14, and the space between these branch wires is filled in by the non-conductor or insulated wire 13 to form a continuous path for the trolley. As the circuit is closed, all the lamps in the section or block will be lighted when the trolley first reaches the near end of the line-wire 9 of the section or block, and each lamp will be successively extinguished when the trolley reaches the insulated section 13 and passes off from the line-wire 9, connected by the conductor 11 with one pole of the lamp; and this successive extinguishing of the lamps continues until the trolley passes off from the farther end of the line-wire of the section or block, when the last lamp of the section or block is extinguished and instantly after all the lamps of the next succeeding section or block are lighted.

Having thus described my invention, I claim as new and desire to secure by Letters Patent—

1. The combination, with a series of electric lamps, one pole of each of which is connected with the ground, and a series of lengths of conductor-wires, one end of each of which is connected with the opposite pole of one of the series of lamps, the opposite ends of the series of conductor-wires secured to but insulated from each other to form a single continuous path for the trolley, of the track, the train, a generator of electricity carried on the train, and a trolley or wiper constructed to light a lamp or lamps in advance of the moving train and extinguish the same, as described.

2. The combination, with a railroad-track and a movable generator of electricity adapted to be carried along the track connected with the ground and with a trolley or wiper, of a bare or trolley wire forming a single continuous path for the trolley parallel with the track divided into sections insulated from each other, one end of each section being connected with the ground, thus forming a succession of electric circuits energized successively by the moving generator, as described.

3. The combination, with the line-wires 9, the branch wires 11 and 14, the lamp 10, connected to the line-wire by the branches, and the insulated section 13, of the source of electric energy carried on the train, connected with the ground through the rails and with the line-wire by a trolley or wiper, as described.

WILLIAM D. SHELDON.

Witnesses:
J. A. MILLER, Jr.,
M. F. BLIGH.